Sept. 11, 1951 R. R. THOMAS 2,567,533
POWER DRIVE FOR RECIPROCATING SAWS
Filed March 6, 1948
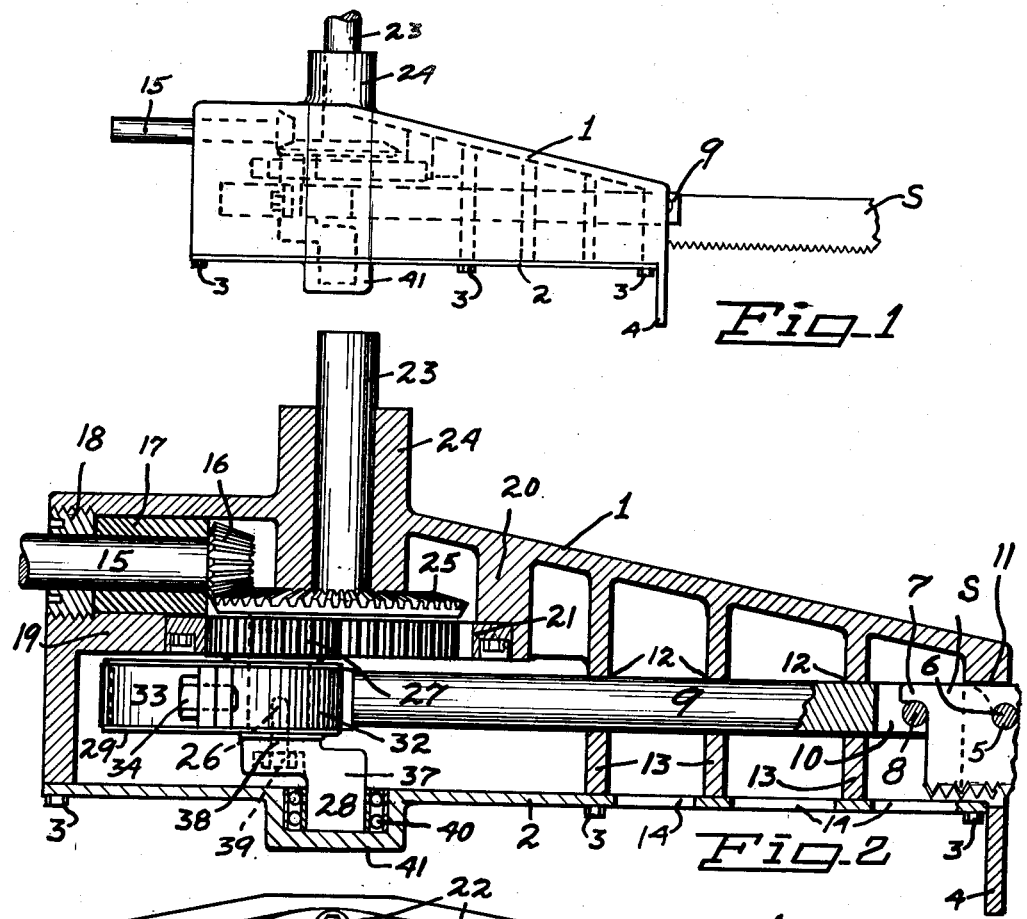
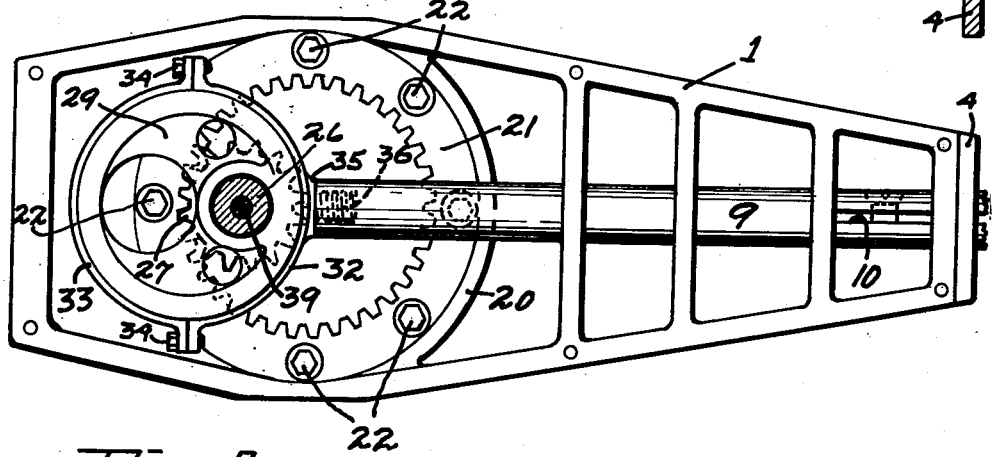
INVENTOR.
Roy R. Thomas
BY
ATTORNEY Patented Sept. 11, 1951

2,567,533

UNITED STATES PATENT OFFICE 2,567,533

POWER DRIVE FOR RECIPROCATING SAWS

Roy R. Thomas, Spokane, Wash., assignor to Lyle Gordan McLean, Spokane, Wash.

Application March 6, 1948, Serial No. 13,449

1 Claim. (Cl. 74—52)

The present invention relates to the general class of machine elements and mechanical movements for converting or translating rotary movement into reciprocating movement and employing planetary gearing of the eccentric type, and more specifically to an improved power drive for reciprocating saws or similar motor-operated and portable reciprocating appliances that may be driven and operated selectively in a vertical plane or in a horizontal plane, as desired.

The primary object of the invention is the provision of an appliance of this type that is equipped with and operated by power transmitting mechanism including a minimum number of compactly arranged parts and a housing therefor, and which may be manipulated with convenience in its application to the work to be performed, and which is strong, durable, and efficient in the performance of its functions.

The invention consists in certain novel combinations and arrangements of smoothly operating parts as will hereinafter be described and more particularly pointed out in the appended claim.

In the accompanying drawings I have illustrated my invention as physically embodied in a reciprocating hack saw in which the parts are combined and arranged in accord with one mode I have devised for the practical application of the principles of my invention. It will however be understood that changes and alterations are contemplated and may be made in these exemplifying drawings and mechanical structures within the scope of my claim without departing from the principles of the invention.

Figure 1 is a view in side elevation showing a portion of a saw in upright or vertical position, and equipped with the operating mechanism of my invention.

Figure 2 is an enlarged vertical longitudinal sectional view through the housing, with the operating parts in full lines; and Figure 3 is a bottom plan view of the appliance partly in cross section with the cover or bottom plate removed for convenience of illustration.

In carrying out my invention I employ, preferably, a cast metal housing 1 having a removable bottom plate 2 that is fastened in place by bolts 3, and the housing, at its front or forward end is equipped with an upright flange or cross bar 4, forming a rest for use with a suitable support, as the housing is manually supported in position for working the saw S. The saw S, which may be of any suitable type, is here shown as a hacksaw, the blade of which is fashioned with a hole 5 for a fastening bolt 6 and a spaced end-tongue 7 for co-action with another bolt 8.

These screw bolts or machine screws 6 and 8, with countersunk heads, fasten the saw to a rod 9 that is provided with a bifurcated or slotted end 10, thus providing a quick detachable means for attaching the saw to the pitman, so that the saw may reciprocate in a guide bearing 11 at the front of the housing, and the rod may reciprocate in slide bearings 12 of integral cross plates or partitions 13 within the interior of the housing 1.

As indicated in Figs. 2 and 3, the removable, bottom plate 2 is fashioned with openings or large slots 14 for clearance of saw dust from the teeth of the saw.

The reciprocating rod 9 of cylindrical shape in cross section, is operated from a suitable motor, or other source of power, through a power shaft 15 and its bevel drive pinion 16, the shaft being journaled in a bearing bushing 17 in the housing and also in a bearing nut 18 threaded in the rear end wall of the housing. The drive pinion and its bushing are located in a space provided within the housing by a horizontal integral plate 19 and an integral curved wall 20, and the plate 19 is recessed to form a seat for an internal gear 21 that is rigidly bolted in its seat by bolts or screws 22.

A gear shaft 23, disposed in a plane perpendicular to the longitudinal axes of the pitman rod and the power shaft, is journaled in a bearing bushing 24 projecting above and below the top wall of the housing, and a large bevel gear 25 rigid with shaft 23 is driven by the pinion 16, or the shaft 23.

For converting or translating the rotary movement of the power shaft 23, pinion 16 and gear 25 into reciprocating movement of the rod 9, the bevel gear 25 is equipped with a fixed eccentric shaft 26. The free end of eccentric shaft 26 is secured to crank arm 37 by bolt 39. Shaft 28 of crank arm 37 is carried by bearing 40 in bearing cup 41 of plate 2. This effects the revolution of eccentric shaft 26 about the axis of shafts 23 and 28.

Journaled on eccentric shaft 26 is a spur pinion 27 having an integral eccentric head 29 formed with a bearing surface about its periphery and confined by spacer 38.

Spur pinion 27 is in constant mesh with fixed internal gear 21 for rotary movement therein.

A sectional eccentric strap for the rod 9 includes the two sections 32 and 33 mounted on the periphery of the head 29 and fastened together by bolts, as 34, and the section 32 is equipped with a radial stud 35, threaded at 36 into the inner end of the rod 9.

The operation of the saw, and the operation of the motor or other source of power that drives the power shaft, may be manually controlled in usual manner, and the rotary driving movement is smoothly translated or converted into reciprocable movement of the saw for quick action in cutting the desired work.

Having thus fully described my invention, what I claim as new and desire to secure by Letters Patent is:

In a power drive for reciprocating saws, the combination with a housing having an inner seat and an internal gear bolted therein, a power shaft journaled in the housing and a bevel pinion thereon, a gear shaft and a bevel gear thereon, and a detachable bottom plate for the housing having a bearing cup axially lined with the gear shaft, of an eccentric shaft carried by the bevel gear and a planetary pinion on the eccentric shaft coacting with the internal gear, a crank shaft journaled in the bearing cup and bolted to the free end of the eccentric shaft, a head on the eccentric shaft, a pitman reciprocable in the housing, and an annular strap on the pitman coacting with said head.

ROY R. THOMAS.

REFERENCES CITED

The following references are of record in the file of this patent:

UNITED STATES PATENTS

| Number | Name | Date |
| --- | --- | --- |
| 1,408,439 | Buckminster | Mar. 7, 1922 |
| 1,557,223 | Warner | Oct. 13, 1925 |
| 1,816,190 | Myers | July 28, 1931 |
| 1,898,956 | Harvie | Feb. 21, 1933 |
| 2,216,828 | Paque | Oct. 8, 1940 |
| 2,250,584 | Krueger et al. | July 29, 1941 |